US012203561B1

(12) United States Patent
Hurley

(10) Patent No.: US 12,203,561 B1
(45) Date of Patent: Jan. 21, 2025

(54) SYSTEM AND METHOD FOR VALVE EXERCISING APPARATUS CONTROL OPERATION

(71) Applicant: Michael Hurley, Sioux Falls, SD (US)

(72) Inventor: Michael Hurley, Sioux Falls, SD (US)

(*) Notice: Subject to any disclaimer, the term of this patent is extended or adjusted under 35 U.S.C. 154(b) by 485 days.

(21) Appl. No.: 17/360,638

(22) Filed: Jun. 28, 2021

(51) Int. Cl.
F16K 31/42 (2006.01)
F16K 37/00 (2006.01)

(52) U.S. Cl.
CPC ........ *F16K 31/423* (2013.01); *F16K 37/0075* (2013.01)

(58) Field of Classification Search
CPC .... F16K 31/423; F16K 31/043; F16K 31/042; F16K 31/045; F16K 37/0075; F16K 37/0083; F16K 37/0091; G05D 1/0061; G05D 1/81
See application file for complete search history.

(56) References Cited

U.S. PATENT DOCUMENTS

| | | | | | |
|---|---|---|---|---|---|
| 2,851,047 | A * | 9/1958 | Eller | ...................... | F16K 31/12 137/86 |
| 2,935,077 | A * | 5/1960 | Keyser | .................. | F16K 31/126 137/86 |
| 3,203,444 | A * | 8/1965 | Gravert | ................... | F16K 31/18 137/391 |
| 4,556,832 | A * | 12/1985 | Rollins | ................ | F16K 31/046 137/625.21 |
| 5,577,373 | A * | 11/1996 | Panoushek | ........... | A01D 41/141 56/DIG. 15 |
| 5,732,737 | A * | 3/1998 | Condon | ................ | F16K 15/035 137/563 |
| 5,751,606 | A * | 5/1998 | Migachyov | ......... | F16K 37/0091 700/282 |
| 6,125,868 | A * | 10/2000 | Murphy | .................. | F16K 31/46 702/41 |
| 7,334,606 | B1 * | 2/2008 | Hurley | .................... | B60R 11/06 251/293 |
| 7,376,529 | B1 * | 5/2008 | Hurley | .................. | G01D 11/30 702/113 |
| 7,415,376 | B1 * | 8/2008 | Hurley | ................ | F16K 37/0091 702/182 |

(Continued)

Primary Examiner — Craig M Schneider
Assistant Examiner — Andrew J Rost
(74) Attorney, Agent, or Firm — Jeffrey A. Proehl; Woods, Fuller, Shultz & Smith, PC

(57) ABSTRACT

A system for exercising a valve may comprise a valve exercising apparatus having inoperative and operative conditions, a transitional event when the apparatus transitions from the inoperative to the operative condition. The exercising apparatus may comprise a valve exercising motor for connecting to the valve and a controller assembly for controlling operation of the motor. The controller assembly may operate in a manual control mode and an automated control mode, with the manual control mode being characterized by operation of elements of the exercising apparatus being initiated by manual input from the operator, and the automated control mode being characterized by operation of elements of the exercising apparatus being initiated by the controller assembly. The controller assembly may be configured to operate the apparatus in a startup condition at the occurrence of the transitional event, and the startup condition may correspond to the manual control mode.

11 Claims, 3 Drawing Sheets

(56) References Cited

U.S. PATENT DOCUMENTS

| | | | | |
|---|---|---|---|---|
| 7,703,473 B1* | 4/2010 | Hurley | ................ | F16K 37/0083 |
| | | | | 248/122.1 |
| 10,295,080 B2* | 5/2019 | Burt | ...................... | F16K 31/535 |
| 11,391,385 B1* | 7/2022 | Hurley | .................... | F16K 31/46 |
| 2011/0273283 A1* | 11/2011 | Schmuttor | ............... | G07C 9/20 |
| | | | | 340/506 |
| 2020/0282984 A1* | 9/2020 | Mizoguchi | .......... | B60W 60/005 |
| 2021/0254746 A1* | 8/2021 | Pierce | .................... | B25B 23/14 |

* cited by examiner

SYSTEM AND METHOD FOR VALVE EXERCISING APPARATUS CONTROL OPERATION

BACKGROUND

Field

The present disclosure relates to valve exercising apparatus systems and more particularly pertains to a new system and method for valve exercising apparatus control operation for enhancing the usability of the exercising apparatus by an operator.

SUMMARY

In one aspect, the disclosure relates to a system for exercising a valve during an exercising session in which the valve has a stem rotatable to operate the valve. The system may comprise a valve exercising apparatus for exercising the valve during the exercising session for the valve, and the valve exercising apparatus may have an inoperative condition and an operative condition. The exercising apparatus may have a transitional event when the apparatus transitions from the inoperative condition to the operative condition. The valve exercising apparatus may include a valve exercising motor configured to be connected to the stem of the valve, and a controller assembly configured to control operation of the valve exercising motor. The controller assembly is configured to operate in a manual control mode and an automated control mode, with the manual control mode being characterized by operation of elements of the exercising apparatus being initiated by manual input from the operator and the automated control mode being characterized by operation of elements of the exercising apparatus being initiated by the controller assembly. The controller assembly maybe configured to operate the apparatus in a startup condition at the occurrence of the transitional event, the startup condition corresponding to the manual control mode.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components and the particulars of the steps set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
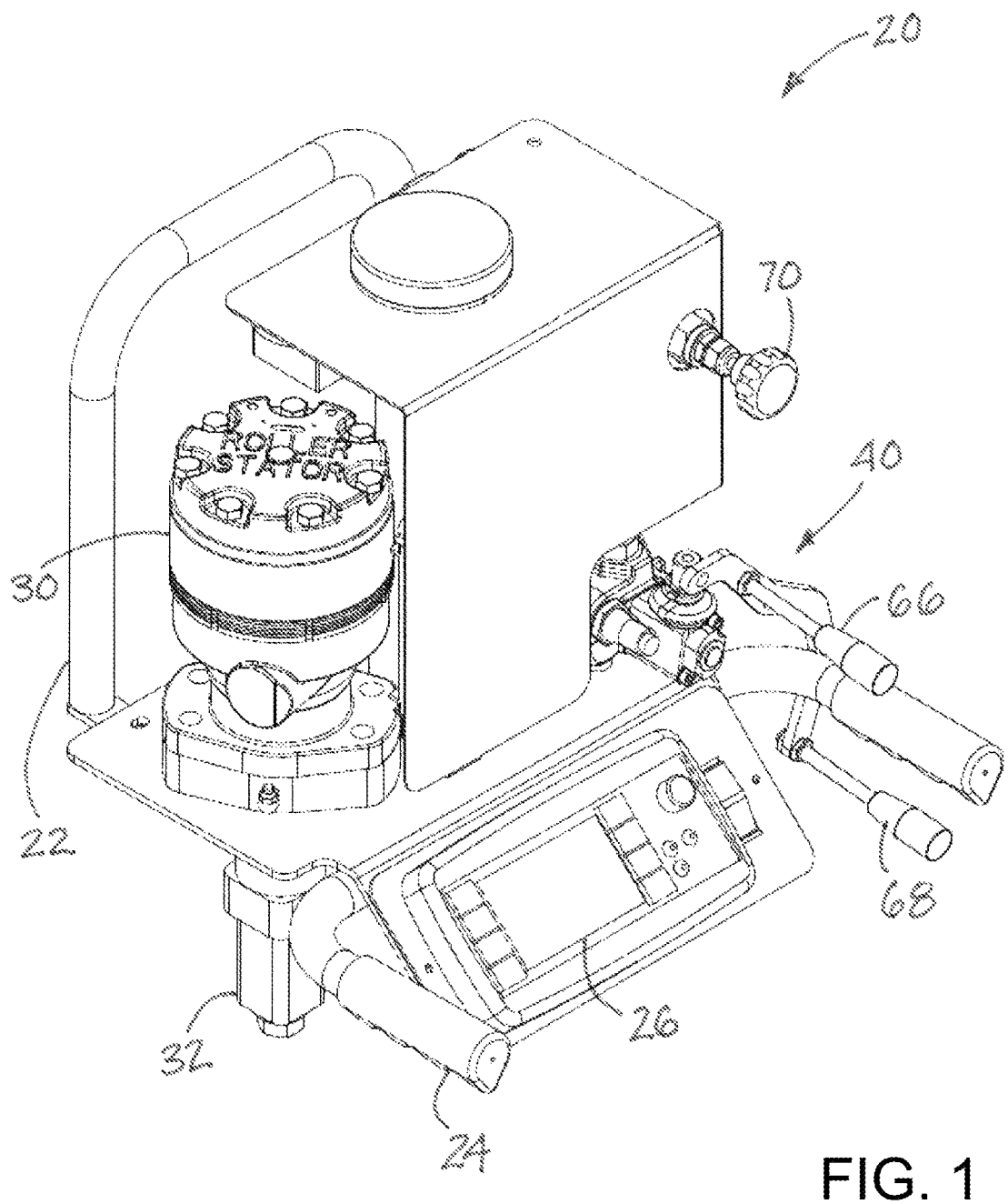
FIG. 1 is a schematic perspective view of a new system for valve exercising apparatus control operation according to the present disclosure.
Figure 2:
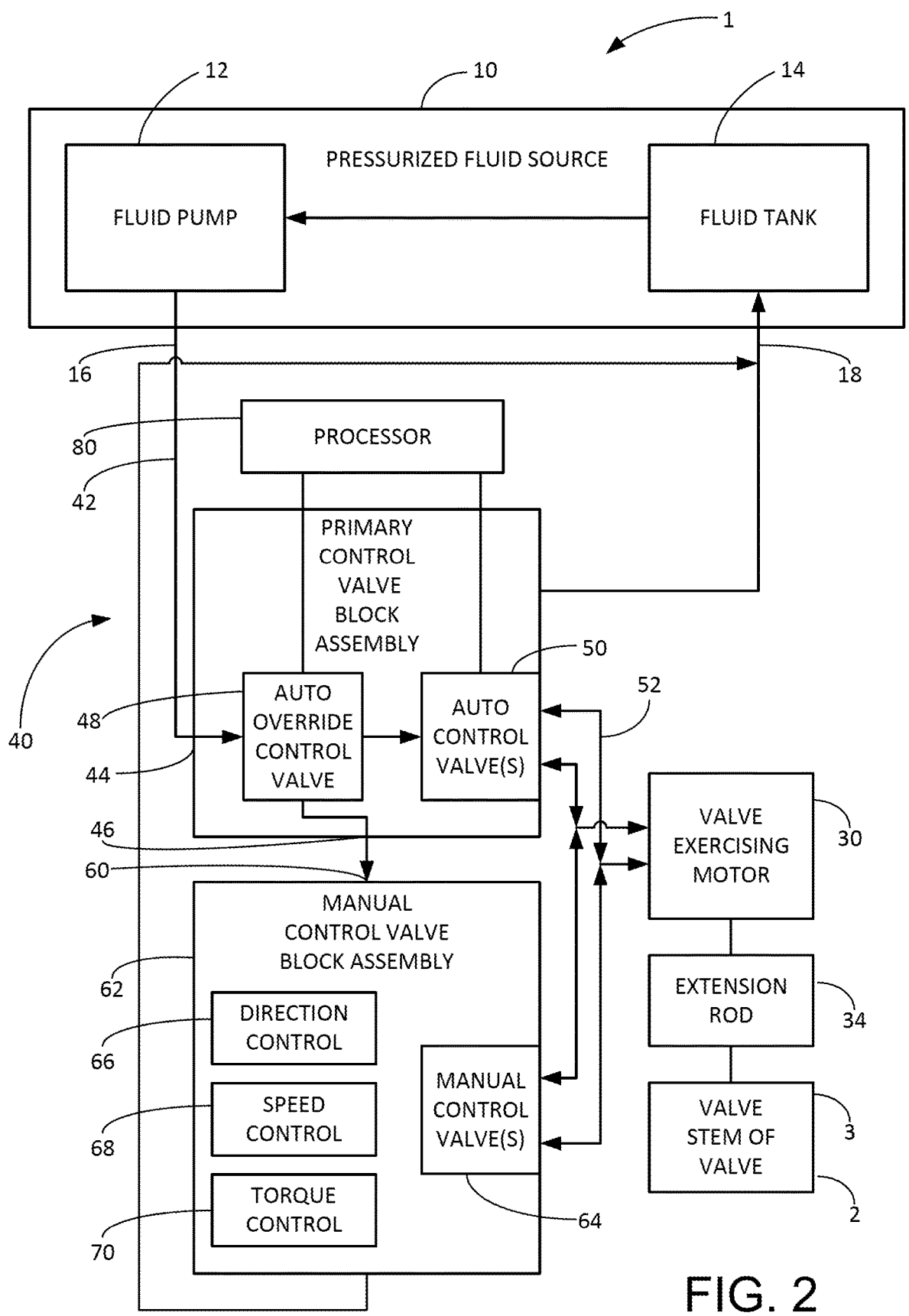
FIG. 2 is a schematic diagram of elements of the system, according to an illustrative embodiment.
Figure 3:
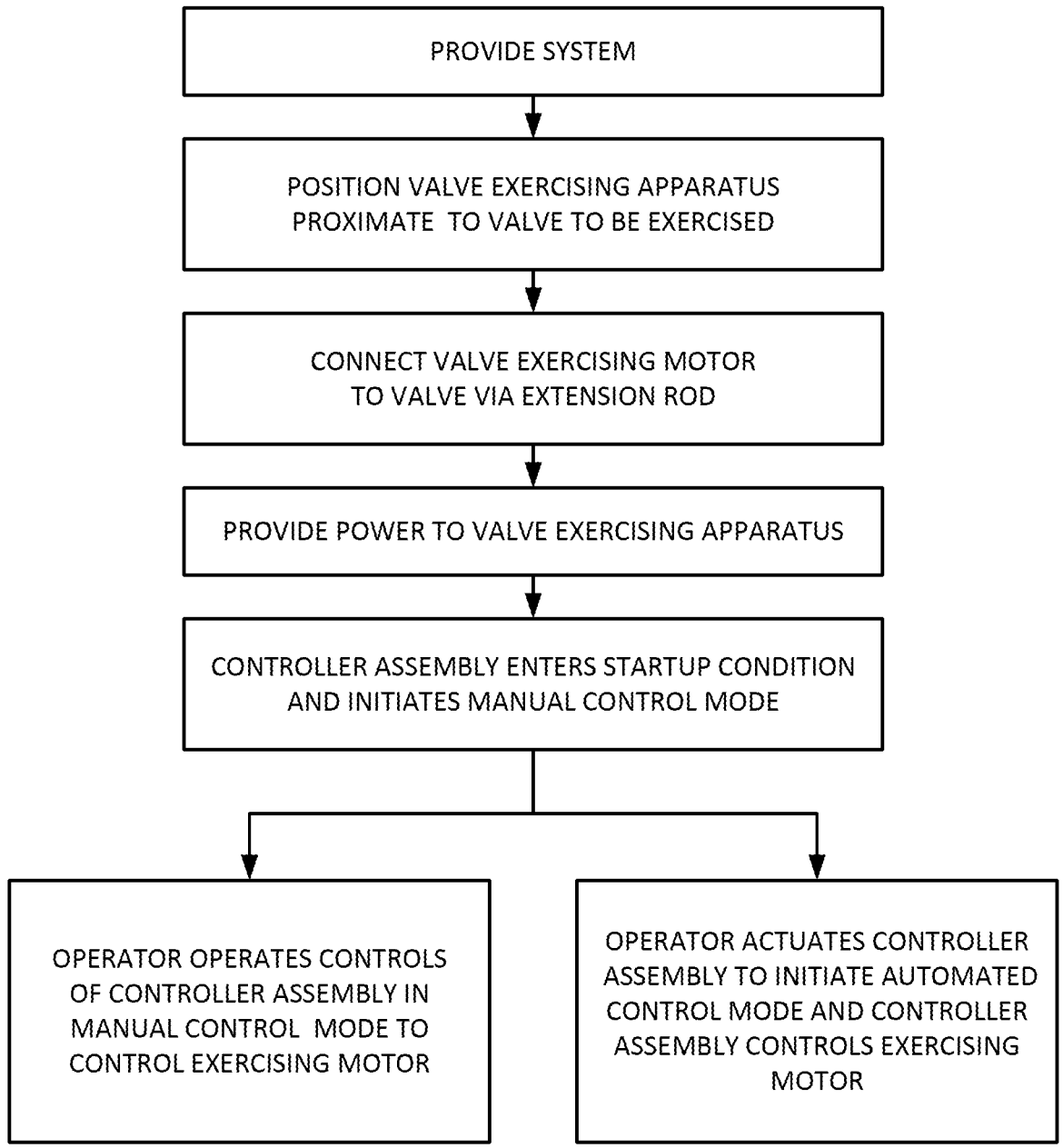
FIG. 3 is a schematic flow diagram of an illustrative method for operation of a valve exercising apparatus, according to an illustrative embodiment.

With reference now to the drawings, and in particular to FIGS. 1 through 3 thereof, a new system and method for valve exercising apparatus control operation embodying the principles and concepts of the disclosed subject matter will be described.

Fluid valve exercising apparatus are typically employed to "exercise," or operate the fluid flow control valves, such as the water supply valves of municipal water supply networks positioned under city streets. Exercising the valve during an exercising session typically involves operating the valve between fully open and fully closed conditions to check the operability of the valve as well as enhance the operational longevity of valves that typically stay in a single orientation for long periods of time without being operated. Occasionally, the valve will be difficult to operate, or sometimes will even be frozen in one orientation, and need to be freed as a part of the exercising process to avoid having to remove and replace the valve.

The applicant has recognized that some fluid valve exercising apparatus only permit operation in one mode, whether it be a purely operator-controlled operation mode or a purely computer-controlled operation mode. Other exercising apparatus have permitted both operator-controlled and computer-controlled operation, but have defaulted to the computer-controlled operation at startup of the apparatus and continue with computer-controlled operation, and only switch to the operator-controlled operation when the operator actively initiates the switch to the operator-controlled operation.

The applicants have also recognized that the initial set up of the apparatus to engage a valve can be made more complicated by computer-controlled operation. Initial setup of the exercising apparatus typically includes connecting an extension rod to the valve stem of the valve and to the exercising apparatus, typically using square drive (e.g., male and female) interface connectors at the connections of the extension rod to the valve stem and to the exercising apparatus. The square drive interface connectors require somewhat more precision in orientations of the male and female components, as compatible orientations for the interface connectors are separated by 90 degrees of rotation of the connectors. Proper orientation requires rotation of the connector on the exercising apparatus to match the orientation of the connector on the extension rod, and the orientation of the connector on the rod is generally dictated by the orientation of the connector on the valve stem of the valve stem. Computer-controlled operation does not easily align the male and female connector components, and generally an operator of the apparatus is more easily able to line up the male and female connectors if the operator can manually control the rotation of the connector on the exercising apparatus to align with the connector on the extension rod, the orientation of which is typically dictated by the orientation of the connector on the valve stem.

The applicants have also recognized that a majority of installed valves that may need to be periodically exercised do not require many turns (e.g., approximately 25 or less) of the valve stem to exercise the valve between fully closed and opened conditions. In those situations, computer-controlled operation may be of limited value when compared to larger valves that may require as many as 100 to 300 turns of the valve stem to cycle the valve between open and closed. With those larger valves, computer-controlled operation is more advantageous.

The applicants have also recognized that some exercising apparatus operators often have a preference for manual operation under certain valve exercising conditions, and these conditions will vary from operator to operator. Automatically defaulting to computer-controlled operation, or only permitting computer controlled operation, is inconvenient at best, irritating at worst, for these types of operators. For example, when a frozen valve is encountered, sometimes freeing the valve from the stuck condition benefits from manual operation by the apparatus operator to finesse the operation of the valve based upon the operator's experience. The apparatus operator has the ability to control rotation on/off, and the degree of rotation speed and rotation torque. Automatic computer-controlled operation of a valve exerciser may lack an operator's ability to sense the precise nature of the resistance exhibited by the valve (e.g., completely stopped vs. highly resistant) and may thus not be able to adjust accordingly, and as a result the computer controlled-operation of the apparatus may stress the valve unnecessarily.

The disclosure generally relates to a system 1 for exercising a valve 2 during an exercising session, although aspects of the disclosure may be applicable to other situations, such as when the valve simply needs to be opened or closed from its current condition. The system 1 may by operated by a human and the operation of the system may be controlled by the human operator to varying degrees. The valve 2 may be of the type having a stem 3 rotatable to operate the valve. In some embodiments, the system 1 may include a pressurized fluid source 10 which is configured to provide pressurized fluid, such as a hydrocarbon-based hydraulic fluid, for powering elements of the system to exercise the valve. An illustrative fluid source 10 may comprise a fluid pump 12 that is configured to output pressurized fluid and a fluid tank 14 that is configured to provide fluid to the fluid pump. The fluid tank 14 may be configured to receive and hold a quantity of fluid available to be drawn through the pump 12, such as fluid being "return" to the fluid source 10 after operating elements of the system. Further, the fluid source 10 may also include fluid transfer lines 16, 18 for transferring fluid between the pump 12 and tank 14 and the valve exercising apparatus 20. The transfer lines may include, for example, a supply line 16 for supplying pressurized fluid to the exercising apparatus 20 and a return line 18 for returning fluid to the fluid source 10 from the exercising apparatus. An illustrative pressurized fluid source 10 is the Power Pack PP6.5 available from Hurco Technologies, Inc. of Harrisburg, SD 57032.

The system 1 may further include a valve exercising apparatus 20 for exercising the valve 1 during the exercising session for the valve. Embodiments of the valve exercising apparatus 20 may have an inoperative condition characterized by the exercising apparatus 20 being incapable of rotating the valve 2 and an operative condition characterized by the exercising apparatus being capable of rotating the valve for the exercising session. Illustratively, the inoperative condition may correspond to the apparatus 20 being turned "off" through the removal of electrical or hydraulic power from the apparatus 20 such that the apparatus does not operate and is not ready to rotate the valve without changing to the operative condition. The operative condition may correspond to the exercising apparatus 20 being turned "on" through the provision of electrical or hydraulic power to the apparatus 20 so that the apparatus is ready to rotate the valve. Additionally, a transitional event may occur when the exercising apparatus 20 transitions from the inoperative condition to the operative condition, such as, for example, when power is initially supplied to the apparatus.

In greater detail, illustrative embodiments of the valve exercising apparatus 20 may include a frame assembly 22 which may be supported on a support arm in a manner permitting movement of the frame assembly with respect to the arm, and the frame assembly may also include at least one guide handle 24 to be engaged by the hand of the operator to position the frame assembly, and the support arm, in a location typically above the valve to be exercised. A control panel 26 may be positioned on the frame assembly 22 for mounting various informative displays and gauges for the operator to view during operation of the exercising apparatus, as well as controls for manipulation by the operator.

The valve exercising apparatus 20 may additionally include a valve exercising motor 30 mounted on the frame assembly 22 for producing the rotation utilized to rotate an exercise the valve 2. The exercising motor 30 may have a stub shaft 32 which is rotated during operation of the exercising motor. The valve exercising motor 30 may have opposite rotational directions of operation for rotating the stub shaft 32, and thereby a valve connected to the stub shaft, in opposite rotational directions. Often, the system may include an extension rod 34 which is configured to connect the stub shaft 32 of the exercising motor to the stem 3 of the valve. The extension rod 34 may have a first connector element at a first end of the rod which is configured to connect to the stub shaft 32 on the exercising motor, and may illustratively take the form of a socket to receive the shaft 32. The extension rod 34 may also have a second connection element at a second end of the rod which is configured to connect to the stem 3 of the valve, and may also illustratively take the form of a socket to receive a portion of the stem.

The valve exercising apparatus 20 may further include a controller assembly 40 which is configured to control operation of elements of the valve exercising apparatus 20. In implementations, the controller assembly 40 may be configured to operate in a manual control mode and an automated control mode. The manual control mode may be characterized by operation of elements of the exercising apparatus 20 being predominantly initiated by manual input from the operator, such as by manual manipulation of controls of the apparatus 20, which directly results in a change in movement of an element of the apparatus 20, such as the stub shaft 32 of the motor 30. The automated control mode may be characterized by operation of elements of the exercising apparatus not being predominantly initiated by the manual input from the operator, such as manipulation of controls, and may be characterized by operation of elements of the exercising apparatus being predominantly initiated by a processor. It will be recognized that operations occurring during the automatic control mode may occur based upon input, such as settings, made by the operator prior to the exercising event, or at least not immediately prior to the operation taking place.

The controller assembly 40 may be configured to operate the exercising apparatus 20 in a startup condition at the occurrence of the transitional event, and the startup condition may be the default condition when power is supplied to the apparatus which enables operation of the apparatus for an exercising session. In some of the most preferred implementations of the disclosure, the startup condition may correspond to the manual control mode of the controller apparatus. The controller assembly 40 may also be configured to operate the apparatus in an optional condition upon selection by the operator of a control mode other than the manual control mode. The optional condition may thus be invoked by the selection of the automated control mode by the operator, such as by actuating a control on the apparatus 20 or on a device in communication with the apparatus 20.

In some embodiments, the control assembly 40 may include a primary control valve block assembly 42. The primary control valve block assembly 42 may have as one functional aspect the enablement of processor-actuated control of operation of the exercising motor during the automated control mode. Another functional aspect of the primary control valve block assembly 42 is the capability of executing a change in the flow of pressurized hydraulic fluid between elements associated with the manual control mode and the automated control mode. In greater detail, the primary control valve block assembly 42 may have a primary fluid input 44 for receiving fluid from the pressurized fluid source 10, and the fluid input 44 may be in fluid communication with the supply line 16 of the fluid source. The primary control valve block assembly 42 may have a bypass fluid output 46.

The primary control valve block assembly 42 may include an automatic override control valve 48 in communication with the primary fluid input 44 to receive pressurized fluid via the primary fluid input. The primary control valve block assembly 42 may also include an automatic operation control valve 50 configured to control fluid flow from the fluid source 10 to the valve exercising motor 20 without operator intervention to cause the fluid flow to vary. The primary control valve block assembly 42 may still further include at least one fluid communication line 52 in communication with the automatic operation control valve 50 and the valve exercising motor 30 such that pressurized fluid, under control of the automatic operation control valve 50, may be provided to the valve exercising motor. Typically, a pair of the fluid communication lines may be in communication with the automatic operation control valve and the valve exercising motor to facilitate bidirectional rotation operation of the exercising motor 20 by the control valve 50.

A first position of the automatic override control valve 48 may be associated with enabling the manual control mode, and may be invoked during the startup condition of the exercising apparatus 20. The first position of the control valve 48 may direct fluid to the bypass fluid output 46 to enable control via the manual control valve block assembly 40, and fluid may not be permitted to flow to the automatic operation control valve 50. A second position of the automatic control valve 48 may be associated with enabling the automated control mode, and may be invoked during the optional condition of the exercising apparatus 20. The second position of the control valve 48 may direct fluid to the automatic operation control valve 50, and fluid may not be permitted to flow to the bypass fluid output 46.

The control assembly 40 may also include a manual control valve block assembly 60 that is configured to enable manual control of operation of the exercising motor 30 by the operator of the exercising apparatus 20. The manual control valve block assembly 60 may be in communication with the bypass fluid output 46 of the primary control valve block 42 to receive fluid from the automatic override control valve 48. The manual control valve block assembly 60 may have a bypass fluid input 62 in communication with the bypass fluid output 46 of the primary control valve block to receive pressurized fluid from the pressurized fluid source 10 via the block assembly 42.

The manual control valve block assembly 60 may include a manual operation control valve 64 which is configured to control fluid flow from the fluid source 10 to the valve exercising motor 30 based upon operator intervention to cause the fluid flow through the control valve 64 to vary. It will be recognized that the manual operation control valve 64 may be a single valve, or may be a combination of more than one valve. The manual control valve block assembly 60 may further include a manually-operated directional control 66 linked to the manual operation control valve 64 and maybe configured to be manually manipulated by the operator to control a rotational direction of operation of the valve exercising motor by controlling the direction of fluid flow to the valve exercising motor 30 from the manual control valve block assembly 60. The manual control valve block assembly 60 may also include a manually operated speed control 68 linked to the manual operation control valve 64 and may be configured to be manually manipulated by the operator to control a rotational speed of operation of the valve exercising motor 30, such as by controlling the volume of fluid passing through the manual operation control valve 64 and reaching the motor 30. Still further, the manual control valve block assembly 60 may include a manually operated torque control 70 linked to the manual operation control valve 64 and maybe configured to be manually manipulated by the operator to control a rotational torque of operation of the valve exercising motor, such as by controlling the pressure of fluid passing through the manual operation control valve 64. In some embodiments, more than one control may be controlled by a common or single lever, such as, for example, the manually operated directional control 66 and the manually operated speed control 68. Illustratively, the control lever may be movable from a home position in opposite directions, and the direction of movement of the control lever by the operator may control the direction of rotation of the exercising motor 30, while the degree to which the control lever is moved from the home position may control the speed of rotation of the motor 30.

The controller assembly 40 may further include a processing capability, such as a processing device or devices capable of executing steps of a program to operate, or assist in the operation of, elements of the valve exercising apparatus 20. Illustratively, the controller assembly 40 may include a processor 80 which is communicatively connected to elements such as, for example, the automatic override control valve 48 and the automatic operation control valve 50 of the primary control valve block assembly 42.

The processor 80 may be configured to operate elements of the valve exercising apparatus 20 in the manual control mode and the automated control mode. Illustratively, when the apparatus 20 is in the manual control mode, the processor 80 may be configured to operate the automatic override control valve 48 to divert pressurized fluid received from the fluid source 10 (e.g., via the primary fluid input 44) to the manual control valve block assembly 60 (e.g., via the bypass fluid output 46). When the apparatus 20 is in the automated control mode, the processor 80 may be configured to operate the automatic override control valve 48 to direct pressurized fluid received from the fluid source 10 (e.g., via the primary fluid input 44) to the automatic operation control valve 50, the operation of which may also be under control of the processor 80.

Significantly, the processor 80 may be configured to operate the automatic override control valve 48 of the primary control valve block assembly to initiate the manual control mode at the transitional event, such as when the exercising apparatus 20 transitions from an inoperative condition to an operative condition, for example, when power is initially supplied to the exercising apparatus 20.

An illustrative method of the disclosure, such as is depicted in FIG. 3, may include providing a system, such as a system 1 having some or all of the elements described in this disclosure, and positioning a valve exercising apparatus of the system proximate to the valve to be exercised or otherwise operated by the apparatus. The valve exercising motor of the exercising apparatus may be connected to the valve in a suitable manner, such as by connection using an extension rod between the motor and the valve. Power may be provided to the valve exercising apparatus, and the controller assembly of the valve exercising apparatus may enter a startup condition which may include initiating the manual control mode of the controller apparatus without operator intervention causing the manual control mode. After the controller assembly of the exercising apparatus has initiated the manual control mode, the operator of the exercising apparatus may proceed to operate the controls of the control assembly in the manual control mode such that operator action or manipulation of the controls is required to cause operation, or cause a change in operation, of the valve exercising motor. Optionally, subsequent to the controller assembly initiating an initial manual control mode, the operator may actuate the controller assembly to initiate the automated control mode of the controller assembly so that elements of the controller assembly, such as the processor, cause operation, or cause a change in operation, of the valve exercising motor. The operator may choose to switch between the manual and automated control modes as he or she desires.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A system for exercising a valve during an exercising session, the valve having a stem rotatable to operate the valve, the system comprising:
    a valve exercising apparatus for exercising the valve during the exercising session for the valve, the valve exercising apparatus having an inoperative condition and an operative condition, the exercising apparatus having a transitional event when the apparatus transitions from the inoperative condition to the operative condition, the valve exercising apparatus comprising:
        a valve exercising motor configured to be connected to the stem of the valve; and
        a controller assembly configured to control operation of the valve exercising motor;
    wherein the controller assembly is configured to operate in a manual control mode and an automated control mode, the manual control mode being characterized by operation of elements of the exercising apparatus being initiated by manual input from the operator, the automated control mode being characterized by operation of elements of the exercising apparatus being initiated by the controller assembly; and
    wherein the controller assembly is configured to operate the apparatus in a startup condition at the occurrence of the transitional event, the startup condition corresponding to the manual control mode;
    wherein the control assembly comprises:
        a primary control valve block assembly configured to enable operation of the exercising motor by the controller during the automated control mode; and
        a manual control valve block assembly configured to enable manual control of operation of the exercising motor by an operator of the exercising apparatus;
    wherein the primary control valve block assembly has a primary fluid input for receiving fluid from a pressurized fluid source and a bypass fluid output in communication with the manual control valve block assembly; and
    wherein the primary control valve block assembly includes an automatic override control valve in communication with the primary fluid input to receive pressurized fluid via the primary fluid input, the automatic override control valve being configured to direct fluid to the bypass fluid output.

2. The system of claim 1 additionally comprising the pressurized fluid source configured to provide pressurized fluid.

3. The system of claim 2 wherein the fluid source comprises:
- a fluid pump configured to output pressurized fluid; and
- a fluid tank configured to provide fluid to the fluid pump, the fluid tank being configured to receive and hold a quantity of fluid.

4. The system of claim 1 wherein the controller assembly includes a processor, the processor being configured to cause the automatic override control valve to direct fluid received by the primary fluid input from the pressurized fluid source to the bypass fluid output during the startup condition of the apparatus.

5. The system of claim 1 wherein the primary control valve block assembly includes an automatic operation control valve configured to control fluid flow from the fluid source to the valve exercising motor without operator intervention to cause the fluid flow to the exercising motor to vary.

6. The system of claim 1 wherein the manual control valve block assembly is in communication with the bypass fluid output of the primary control valve block to receive fluid from the automatic override control valve.

7. The system of claim 6 wherein the manual control valve block assembly includes a manual operation control valve configured to control fluid flow from the fluid source to the valve exercising motor based upon operator intervention to cause the fluid flow to the exercising motor to vary.

8. The system of claim 7 wherein the manual control valve block assembly includes a manually-operated directional control linked to the manual control valve and being configured to be manually manipulated by the operator to control a rotational direction of operation of the valve exercising motor.

9. The system of claim 7 wherein the manual control valve block assembly includes a manually operated speed control linked to the manual control valve and being configured to be manually manipulated by the operator to control a rotational speed of operation of the valve exercising motor.

10. The system of claim 7 wherein the manual control valve block assembly includes a manually operated torque control linked to the manual control valve and being configured to be manually manipulated by the operator to control a rotational torque of operation of the valve exercising motor.

11. The system of claim 1 wherein the controller assembly includes a processor, the processor being configured to cause the automatic override control valve to direct fluid received by the primary fluid input from the pressurized fluid source to the bypass fluid output at the occurrence of the transitional event.

* * * * *